United States Patent [19]

Hori

[11] Patent Number: 4,971,456

[45] Date of Patent: Nov. 20, 1990

[54] FLUID-FILLED ELASTIC CENTER BEARING MOUNT

[75] Inventor: Hiroaki Hori, Komaki, Japan

[73] Assignee: Tokai Rubber Industries, Ltd., Aichi, Japan

[21] Appl. No.: 415,573

[22] Filed: Oct. 2, 1989

[30] Foreign Application Priority Data

Oct. 8, 1988 [JP] Japan .................. 63-132177[U]

[51] Int. Cl.⁵ .................. F16F 9/10; F16F 1/38
[52] U.S. Cl. .................. 384/99; 267/140.4
[58] Field of Search .............. 384/99, 535, 536, 581, 384/582; 267/140.1 R, 140.1 C

[56] References Cited

U.S. PATENT DOCUMENTS

| | | | |
|---|---|---|---|
| 2,614,896 | 10/1952 | Pierce, Jr. | 384/99 |
| 4,705,410 | 11/1987 | Von Broock | 384/99 |
| 4,771,990 | 9/1988 | Domer | 267/140.1 C |
| 4,786,036 | 11/1988 | Kanda | 267/140.1 C |
| 4,817,926 | 4/1989 | Schwerdt | 267/140.1 C |

FOREIGN PATENT DOCUMENTS

| | | | |
|---|---|---|---|
| 29402 | 9/1979 | Japan . | |
| 54316 | 4/1984 | Japan . | |
| 168931 | 9/1985 | Japan | 267/140.1 C |
| 172743 | 9/1985 | Japan | 267/140.1 C |
| 118132 | 5/1987 | Japan | 267/140.1 C |
| 184250 | 8/1987 | Japan | 267/140.1 C |

Primary Examiner—Thomas R. Hannon
Attorney, Agent, or Firm—Oliff & Berridge

[57] ABSTRACT

A mount for flexible connection of a vehicle propeller shaft to a vehicle body, including an inner sleeve and an outer sleeve, and an elastic body interposed between said inner and outer sleeves for elastic connection therebetween. The elastic body partially defines at least two pairs of upper and lower fluid chambers filled with a non-compressible fluid, between the inner and outer sleeves, such that the upper and lower fluid chambers of each pair are spaced from each other in a circumferential direction of the mount, and such that pressures of the fluid in the upper and lower fluid chambers change in opposite directions upon application of vibrations between the inner and outer sleeves. The upper and lower chambers of each pair are held in communication with each other through a suitable orifice.

15 Claims, 5 Drawing Sheets

FLUID-FILLED ELASTIC CENTER BEARING MOUNT

BACKGROUND OF THE INVENTION

1. Field of the Invention

The present invention relates to a fluid-filled elastic center bearing mount for flexibly supporting a propeller shaft of a motor vehicle on the vehicle body.

2. Discussion of the Prior Art

As an intermediate bearing for supporting the propeller shaft of a motor vehicle at its longitudinally middle portion on the body of the vehicle, there has been used a so-called center bearing mount. Examples of such a center bearing mount are disclosed in laid-open Publication No. 54-29402 of examined Japanese Utility Model Application and laid-open Publication No. 59-54316 of unexamined Japanese Utility Model Application. The center bearing mounts disclosed in these publications have a metallic inner sleeve and a metallic outer sleeve which are disposed with a suitable radial spacing therebetween, and an elastic body made of a rubber material interposed between the inner and outer sleeves. The propeller shaft is inserted through the inner sleeve of the mount via a suitable center bearing such as a ball bearing, while the outer sleeve of the mount is secured to the vehicle body, whereby the propeller shaft is flexibly connected to the vehicle body by the center bearing mount.

The center bearing mount is required to provide two different functions, namely, supporting the propeller shaft and isolating or damping the vibrations of the propeller shaft from being transmitted to the vehicle body. The second function consists principally of two vibration damping or isolating capabilities or characteristics, that is, sufficient capability of damping large-amplitude vibrations having a relatively low frequency of about 5–30 Hz which occur due to secondary couples caused by a joint angle of the propeller shaft upon starting of the vehicle, and a characteristic of exhibiting sufficiently low dynamic spring constant with respect to small-amplitude vibrations having a relatively high frequency of about 50–200 Hz which occur due to a secondary component of a rotary motion of the vehicle engine transmitted to the propeller shaft.

In view of the above requirements, the assignee of the present application developed a fluid-filled elastic center bearing mount in laid-open Publication No. 61-166250 of unexamined Utility Model Application wherein an elastic body partially defining a pair of fluid chambers between the inner and outer sleeves, such that the two fluid chambers are located opposite to each other in a diametric direction of the sleeves in which input vibrations are primarily received by the mount. The fluid chambers are filled with a non-compressible fluid, and are held in communication with each other through a suitable orifice. In this type of fluid-filled elastic center bearing mount, the input vibrations applied to the inner and outer sleeves are damped or isolated based on resonance of the fluid which flows through the orifice due to pressure variations in the fluid chambers caused by a relative displacement of the two sleeves.

However, the range of the frequency of the vibrations that can be effectively damped or isolated based on the fluid mass resonance in the center bearing mount constructed as described above is limited or determined by the specific configuration and dimensions of the orifice. If the orifice is tuned so as to effectively damp low-frequency vibrations, the orifice tends to be placed in a condition as if the orifice was closed when the input vibrations have a frequency higher than that of the low-frequency vibrations to which the orifice is tuned. Consequently, the center bearing mount exhibits an excessively high dynamic spring constant upon application of the high-frequency vibrations, and suffers from comparatively low vibration isolating capability for the high-frequency vibrations.

Thus, the fluid-filled elastic center bearing mount described above is still unsatisfactory or has room for improvement, particularly in terms of the frequency range of the vibrations that can be suitably and effectively damped or isolated, for assuring enhanced driving comfort of the vehicle.

SUMMARY OF THE INVENTION

It is therefore an object of the present invention to provide a fluid-filled elastic center bearing mount which is capable of effectively damping or isolating vibrations over a wide frequency range of the vibrations.

The above object may be attained according to the principle of the present invention, which provides a fluid-filled elastic center bearing mount for flexibly supporting a propeller shaft of a motor vehicle on a body of the vehicle through a center bearing, comprising: an inner sleeve and an outer sleeve disposed radially outwardly of the inner sleeve, the propeller shaft extending through the inner sleeve while the outer sleeve is secured to the body; an elastic body interposed between the inner and outer sleeves for elastically connecting the inner and outer sleeves, the elastic body partially defining at least two pairs of upper and lower fluid chambers filled with a non-compressible fluid, between the inner and outer sleeves, such that the upper and lower fluid chambers of each of the at least two pairs are spaced from each other in a circumferential direction of the inner and outer sleeves, and such that pressures of the fluid in the upper and lower fluid chambers of each pair change in opposite directions upon application of vibrations between the inner and outer sleeves; and orifice-defining means for defining an orifice passage for fluid communication between the upper and lower fluid chambers of each pair.

In the fluid-filled elastic center bearing mount of the present invention constructed as described above, the vibrations applied between the inner and outer sleeves cause the volumes of the upper and lower fluid chambers of each pair to change in the opposite directions, i.e., the volume of one of the upper and lower fluid chambers increases while that of the other fluid chamber decreases, whereby the fluid pressures in the upper and lower fluid chambers change in the opposite directions, forcing the fluid to flow between these two fluid chambers of each of the at least two pairs through the respective orifice passages. The orifice passage for fluid communication between the upper and lower fluid chambers of one pair may be tuned to a certain relatively low frequency of the input vibrations to be damped, while the orifice passage for another pair of upper and lower fluid chambers may be tuned to a given relatively high frequency of the input vibrations to be isolated or damped. Accordingly, the present fluid-filled elastic center bearing mount provides both a high damping effect for low-frequency vibrations, and a sufficiently low dynamic spring constant for high-frequency vibrations, both based on the resonance of the fluid masses flowing through the respective orifice passages. Thus, the present center bearing mount is capable of exhibiting excellent vibration damping or isolating characteristics over a comparatively wide range of frequency of the input vibrations.

The upper and lower fluid chambers of each pair may be positioned on both sides of a straight line which passes a center of the mount and which is perpendicular to a load-receiving direction in which the vibrations are primarily received by the mount, so that the upper and lower fluid chambers are opposed to each other in the load-receiving direction. This arrangement permits relatively easy and effective changes in the volumes of the upper and lower fluid chambers in the opposite directions, and accordingly large amounts of flow of the fluid between the two fluid chambers through the appropriate orifice passage, when the vibrations are received in the load-receiving direction.

The above-indicated at least two pairs of upper and lower fluid chambers may consist of a first pair of upper and lower fluid chambers which are opposed to each other in a diametric direction of the mount which is inclined at a predetermined angle with respect to the load-receiving direction, and at least one second pair of upper and lower fluid chambers, each second pair being provided on the upper or lower fluid chamber of the first pair. That is, the upper and lower fluid chambers of each of the at least one second pair consist of two portions of a corresponding one of the first pair of upper and lower fluid chambers, which two portions are spaced from each other in the circumferential direction of the inner and outer sleeves. This arrangement also permits relatively easy and effective changes in the volumes of the upper and lower fluid chambers of each pair in the opposite directions, when the inner and outer sleeves are displaced relative to each other upon application of the input vibrations therebetween in the load-receiving direction.

BRIEF DESCRIPTION OF THE DRAWINGS

The above and optional objects, features and advantages of the present invention will be better understood by reading the following detailed description of presently preferred embodiments of the present invention, when considered in connection with the accompanying drawings, in which.

DETAILED DESCRIPTION OF THE PREFERRED EMBODIMENTS

Figure 1:
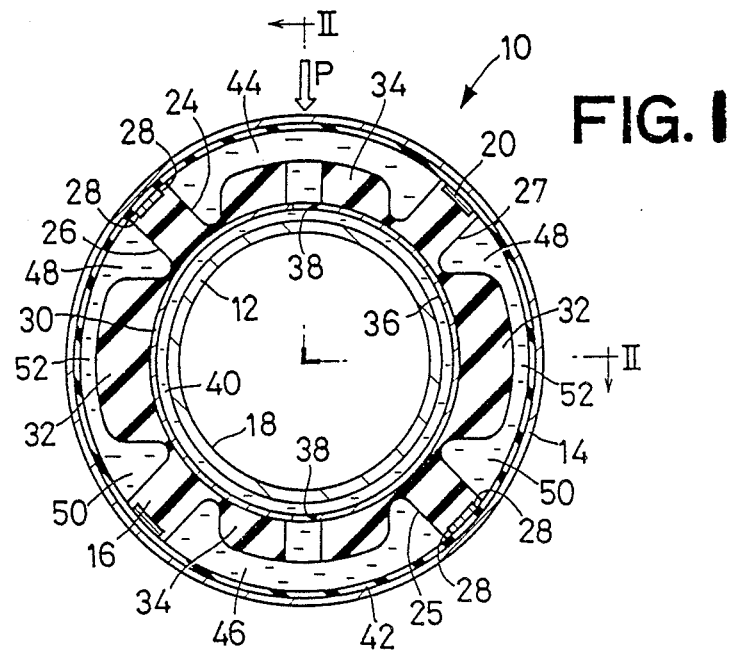
FIG. 1 is an elevational view in transverse cross section of a fluid-filled elastic center bearing mount of the present invention.
Figure 2:
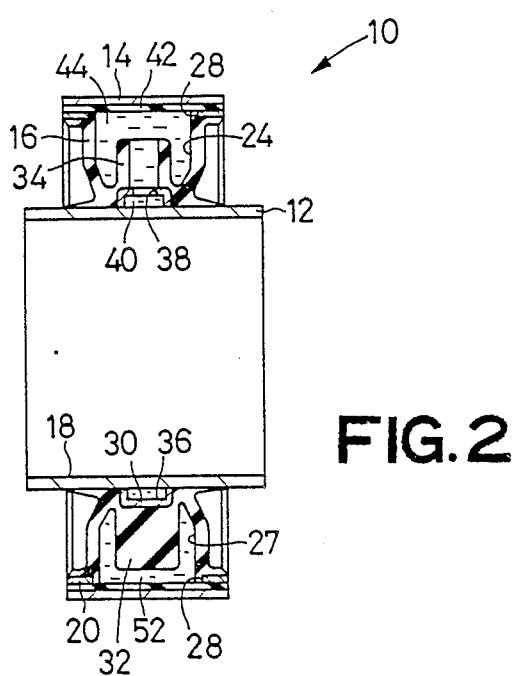
FIG. 2 is an elevational cross sectional view taken along line II—II of FIG. 1.

Referring first to FIGS. 1 and 2, reference numeral 10 generally designates a fluid-filled elastic center bearing mount which has an inner sleeve 12 and an outer sleeve 14, each made of a metallic material. The outer sleeve 14 is disposed radially outwardly of the inner sleeve 12, such that the two sleeves 12, 14 are coaxial with each other, with a suitable radial distance therebetween. Between the inner and outer sleeves 12, 14, there is formed a generally cylindrical elastic body 16 for elastically and integrally connecting the two sleeves 12, 14.

The center bearing mount 10 is used for flexibly supporting a propeller shaft of a motor vehicle to the body of the vehicle, such that the propeller shaft extends through a bore 18 of the inner sleeve 12, with a center bearing interposed between the propeller shaft and the inner sleeve 12, while the outer sleeve 14 is secured to the vehicle body. The center bearing mount 10 is installed between the vehicle body and the propeller shaft, in the vertical orientation as indicated at P in FIG. 1, so that a vibrational load is applied to the mount 10 primarily in the vertical direction of FIG. 1, i.e., the mount 10 primarily receives the vibrations which are applied in the vertical direction P of the vehicle. This direction P will be referred to as "load-receiving direction" when appropriate.

Figure 3:
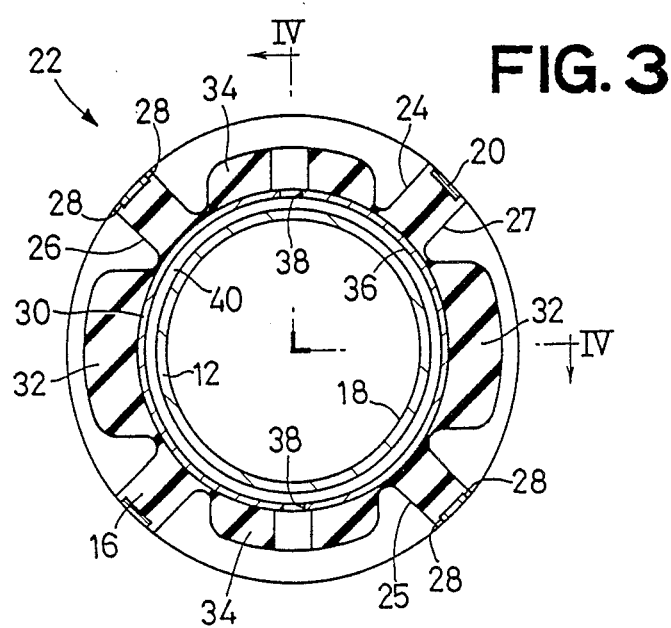
FIG. 3 is an elevational view in transverse cross section of an inner assembly of the mount prepared by vulcanization during manufacture of the mount.
Figure 4:
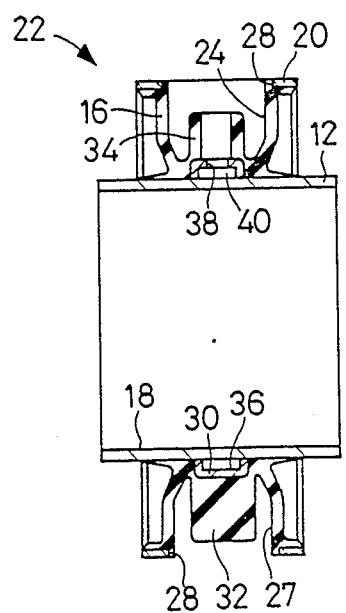
FIG. 4 is a cross sectional view taken along line IV—IV of FIG. 3.

The inner sleeve 12 has a cylindrical shape in transverse cross section. On an axially intermediate portion of the outer circumferential surface of the inner sleeve 12, there is fixedly fitted an orifice-defining ring 30, as shown in FIG. 2. The elastic body 16 indicated above is bonded by means of vulcanization to the outer circumference of the inner sleeve 12, and a thin-walled metallic sleeve 20 is bonded by vulcanization to the outer circumferential surface of the body 16. The inner sleeve 12 and the orifice-defining ring 30, secured to the inner surface of the elastic body 16, and the metallic sleeve 20, secured to the outer surface of the elastic body 16, cooperate with the elastic body 16 to constitute an inner assembly 22 of the present fluid-filled elastic center bearing mount 10, as illustrated in FIGS. 3 and 4. That is, the inner assembly 22 is an intermediate product prepared during manufacture of the mount 10, wherein the inner and metallic sleeves 12, 20 and the orifice-defining ring 30 are secured to the inner and outer circumferential surfaces of the elastic body 16, by vulcanization of an unvulcanized material into the elastic body 16 within a suitable mold.

The elastic body 16 of the inner assembly 22 has a first pocket 24 and a second pocket 25 formed in diametrically opposite portions of its outer circumferential surface, such that the first and second pockets 24, 25 are opposed to each other in the vertical direction as seen in FIG. 3, i.e., in the load-receiving direction P. Each of the first and second pockets 24, 25 extends over about a quarter of the circumference of the elastic body 16. The metallic sleeve 20 has windows 28 corresponding to the pockets 24, 25, such that the pockets 24, 25 are open through the respective windows 28.

The elastic body 16 further has a third pocket 26 and a fourth pocket 27 formed in diametrically opposite portions of its outer circumferential surface, such that the third and fourth pockets 26, 27 are opposed to each other in the horizontal direction as seen in FIG. 3, which is perpendicular to the load-receiving direction P. In other words, each of the third and fourth pockets 26, 27 is located between the first and second pockets 24, 25 in the circumferential direction of the elastic body 16. Like the first and second pockets 24, 25, each of the third and fourth pockets 26, 27 extends over about a quarter of the circumference of the elastic body 16. These pockets 26, 27 are also open through respective windows 28 formed through the metallic sleeve 20. Thus, the metallic sleeve 20 has a total of four windows 28 aligned with the four pockets 24, 25, 26, 27, so that the pockets are open in the outer circumferential surface of the sleeve 20, through the respective windows 28.

The elastic body 16 has a pair of integrally formed elastic protrusions 32, which protrude a suitable distance radially outwardly into the respective third and fourth pockets 26, 27, such that each elastic protrusion 32 is located at an intermediate position of the corresponding pocket 26, 27 in the circumferential direction of the elastic body 16. Each elastic protrusion 32 substantially divides the corresponding pocket 26, 27 into two halves which are spaced apart from each other in the circumferential direction of the elastic body 16. The elastic protrusions 32 have a height slightly smaller than the depth of the third and fourth pockets 26, 27.

The elastic body 16 further has a pair of integrally formed elastic stops 34, which protrude a suitable distance into the respective first and second pockets 24, 25, in radially outward directions from the inner sleeve 12 toward the outer sleeve 14. While each elastic stop 34 is located at an intermediate position of the corresponding pocket 24, 25 in the circumferential direction of the elastic body 16, the height of the elastic stop is considerably smaller than the depth of the pocket 24, 25. Unlike the elastic protrusions 32, therefore, the elastic stop does not substantially divide the pocket 24, 25.

The orifice-defining ring 30 fitted on the outer circumferential surface of the inner sleeve 12 has a U-shaped annular groove 36 formed by its inner circumferential surface over the entire circumference. With the opening of the annular groove 36 closed by the outer circumferential surface of the inner sleeve 12, there is formed an annular passage. This annular passage communicates with the first and second pockets 24, 25 through two communication holes 38 formed through the thicknesses of the orifice-defining ring 30 and the elastic stops 34. In the present embodiment, the annular passage 36 and the communication holes 38 cooperate to define a first orifice passage 40 for fluid communication between the first and second pockets 24, 25.

The thus constructed inner assembly 22 of the elastic center bearing mount 10 is radially compressed as needed, by applying a compressive force to the metallic sleeve 20. Then, the outer sleeve 14 having a thin-walled sealing rubber layer 42 on its inner surface is mounted on the inner assembly 22, such that the sealing rubber layer 42 is held in fluid-tight contact with the outer surface of the metallic sleeve 20, as shown in FIGS. 1 and 2. As a result, the first, second, third and fourth pockets 24, 25, 26, 27 are fluid-tightly closed by the outer sleeve 14, more precisely, by the sealing rubber layer 42 of the outer sleeve 14.

The pockets 24–27 thus closed by the outer sleeve 14 are filled with a suitable non-compressible fluid such as water, alkylene glycol, polyalkylene glycol and silicone oil. The filling of the pockets with the non-compressible fluid can be effected by mounting the outer sleeve 14 on the inner assembly 22 within a mass of the non-compressible fluid.

The thus prepared fluid-filled elastic center bearing mount 10 of FIGS. 1–2 has a first upper fluid chamber 44 partially defined by the first pocket 24, and a first lower fluid chamber 46 partially defined by the second pocket 25. These first upper and lower fluid chambers 44, 46 are held in communication with each other through the first orifice passage 40 described above.

The center bearing mount 10 further has two pairs of second fluid chambers 48, 50, which correspond to the third and fourth pockets 26, 27. More specifically, each of the closed pockets 26, 27 is substantially divided by the elastic protrusion 32 into a second upper fluid chamber 48 and a second lower fluid chamber 50, which are disposed on the circumferentially opposite sides of the elastic protrusion 32. The second upper and lower fluid chambers 48, 50 provided for each of the third and fourth pockets 26, 27 are held in communication with each other through a second orifice passage 52. This orifice 52 is a restricted portion defined by and between the radially outward end face (top face) of the elastic protrusion 32 and the inner surface of the sealing rubber layer 42.

As indicated above, the fluid-filled elastic center bearing mount 10 is installed so that primary vibrations are applied between the inner and outer sleeves 12, 14, in the load-receiving direction P (vertical direction of FIG. 1). That is, the first upper and lower fluid chambers 44, 46 are opposed to each other in the load-receiving direction P, such that the upper and lower fluid chambers 44, 46 are positioned on both sides of a horizontal straight line which passes the center of the mount 10, at right angles with respect to the load-receiving or vertical direction P. Similarly, the second upper and lower fluid chambers 48, 50 provided for each of the third and fourth pockets 26, 27 are opposed to each other in the load-receiving direction. In this arrangement, vibrations applied to the mount 10 in the load-receiving direction P cause relative radial displacements of the inner and outer sleeves 12, 14 and elastic deformation of the elastic body 16, which in turn causes the fluid pressures in the upper and lower fluid chambers 44, 46 of the first pair to change in the opposite directions. Namely, the pressure in the upper chamber 44 decreases while that in the lower chamber 46 increases, or vice versa. Similarly, the fluid pressures in the upper and lower fluid chambers 48, 50 of each second pair change in the opposite directions when the vibrations are received in the load-receiving direction P.

As a result of the relative pressure changes between the first upper and lower fluid chambers 44, 46 and between the second upper and lower fluid chambers 48, 50, the fluid is forced to flow between the upper and lower chambers 44, 46 through the first orifice passage 40, and between the upper and lower chambers 48, 50 through the second orifice passages 52.

In the present fluid-filled elastic center bearing mount 10 wherein the fluid flows through the first and second orifice passages 40, 52 upon application of vibrations between the inner and outer sleeves 12, 14, the dimensions of the orifice passages 40, 52 are adjusted or tuned to respective frequency ranges of the input vibrations which are to be isolated or damped, based on resonance of the fluid masses flowing through the orifices 40, 52. Thus, the center bearing mount 10 exhibits desired vibration isolating or damping characteristics for the different frequency ranges of the input vibrations to which the orifice passages 40, 52 are tuned.

Described more particularly, the first orifice passage 40 has a relatively large length and a relatively small cross sectional area of fluid communication, so that the resonance of the fluid mass flowing through the first orifice passage 40 occurs when the frequency of the input vibrations is comparatively low. On the other hand, each of the second orifice passages 52 communicating the second upper and lower fluid chambers 48, 50 has a relatively small length and a relatively large cross sectional area of fluid communication, so that the resonance of the fluid mass flowing through the second orifice passage 52 occurs when the input vibration frequency is comparatively high.

Thus, the present fluid-filled elastic center bearing mount 10 exhibits a sufficiently high vibration damping effect based on the resonance of the fluid mass flowing through the first orifice passage 40, for large-amplitude vibrations having a relatively low frequency, which are generated due to secondary couples caused by a joint angle of the propeller shaft upon starting of the vehicle. Accordingly, the driver's and passengers' compartment of the vehicle is kept substantially free from such low-frequency vibrations. On the other hand, the center bearing mount 10 exhibits a sufficiently low dynamic spring constant based on the resonance of the fluid flowing through the second orifice passages 52, for small-amplitude vibrations having a relatively high frequency, which are generated due to secondary component of a rotary motion of the vehicle engine transmitted to the propeller shaft during running of the vehicle. Accordingly, the vehicle compartment is substantially free from such high-frequency vibrations and high-pitched noises.

Further, the center bearing mount 10 limits a maximum displacement of the propeller shaft relative to the vehicle body, since the maximum relative displacement between the inner and outer sleeves 12, 14 caused by the input vibrations is limited by abutting contact of the elastic stops 34 in the first upper and lower fluid chambers 44, 46, with the inner surface of the outer sleeve 14 (sealing rubber layer 42). These elastic stops 34 also serve to protect the elastic body 16 from an excessive amount of elastic deformation when the mount 10 receives vibrations of a considerably large magnitude. Thus, the durability of the mount 10 is improved.

Referring to FIGS. 5-10, there will be described other embodiments of the fluid-filled elastic center bearing mount of the present invention. The same reference numerals as used in FIGS. 1-4 will be used in FIGS. 5-10, to identify the functionally corresponding elements. In the interest of brevity and simplification, these elements will not be redundantly described.

Figure 5:
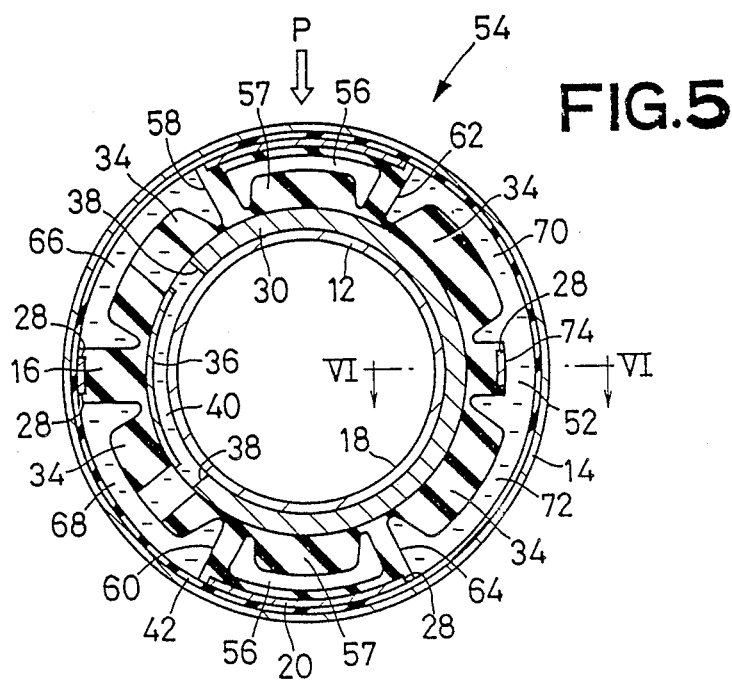
FIG. 5 is a transverse cross sectional view of another embodiment of the center bearing mount of the invention.

As a first modified embodiment of the invention, there is shown in FIG. 5 a fluid-filled elastic center bearing mount 54.

In this center bearing mount 54, the elastic body 16 has a pair of generally arcuate voids 56 formed therethrough so as to extend in the axial direction, in diametrically opposite portions such that the two arcuate voids 56 are opposed to each other in the load-receiving direction P. Each arcuate void 56 has a suitable circumferential length. The elastic body 16 further has a first pocket 58 formed on one of the circumferentially opposite sides of one of the two arcuate voids 56, a second pocket 60 formed on one of the circumferentially opposite sides of the other arcuate void 56, a third pocket 62 formed on the other side of the above-indicated one arcuate void 56, and a fourth pocket 64 formed on the other side of the other arcuate void 56. Each of these four pockets 58, 60, 62, 64 has a circumferential length corresponding to about one sixth of the entire circumference of the elastic body 16. In each of the arcuate voids 56, there is formed an elastic stop 57 as an integral part of the elastic body 16, such that the elastic stop 57 protrudes a suitable distance in a radially outward direction from the inner sleeve 12 toward the outer sleeve 14.

The first, second, third and fourth pockets 58, 60, 62, 64 are open through the respective windows 28 formed through the metallic sleeve 20, and are fluid-tightly closed by the sealing rubber layer 42 formed on the inner circumferential surface of the outer sleeve 14. As in the first embodiment, the closed pockets 58, 60, 62, 64 are filled with a non-compressible fluid.

Figure 6:
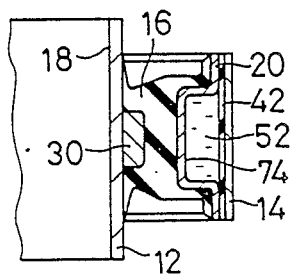
FIG. 6 is a cross sectional view taken along line VI—VI of FIG. 5.

The first and second pockets 58, 60 partially define a pair of first fluid chambers, respectively, i.e., a first upper fluid chamber 66 and a first lower fluid chamber 68. Further, the third and fourth pockets 62, 64 partially define a second pair of fluid chambers, respectively, i.e., a second upper fluid chamber 70 and a second lower fluid chamber 22. In the present embodiment, the first orifice passage 40 for fluid communication between the first upper and lower fluid chambers 66, 68 is provided by the U-shaped arcuate groove 36 formed in the inner surface of the orifice-defining ring 30 over a suitable circumferential length. The orifice passage 40 is defined by this arcuate groove 36 and the outer circumferential surface of the inner sleeve 12 which closes the opening of the groove 36. On the other hand, the second orifice passage 52 is provided by a U-shaped groove 74, which is formed in an axially central portion of the metallic sleeve 20, as indicated in FIG. 6, so as to connect the two windows 28 corresponding to the third and fourth pockets 62, 64. The orifice passage 52 is defined by this groove 74 and the sealing rubber layer 42 of the outer sleeve 14 which closes the opening of the groove 74.

In the present fluid-filled elastic center bearing mount 54 of FIGS. 5-6, too, the first upper and lower fluid chambers 58, 60 are opposed to each other in the load-receiving direction P, such that the two chambers 58, 60 are located on both sides of a horizontal straight line (in FIG. 5) which passes through the center of the mount 10, perpendicular to the load-receiving direction P. Similarly, the second upper and lower fluid chambers 62, 64 are opposed to each other in the load-receiving direction P. According to this arrangement, the fluid pressures in the upper and lower fluid chambers 58, 60 and 62, 64 change in the opposite directions upon application of vibrations between the inner and outer sleeves 12, 14. As a result, the fluid is forced to flow between the first upper and lower fluid chambers 58, 60 through the first orifice passage 40, and between the second upper and lower fluid chambers 62, 64 through the second orifice passage 52.

The present center bearing mount 54 also has excellent vibration isolating or damping capabilities over a relatively wide range of frequency of the input vibrations, i.e., exhibits not only an excellent damping characteristic for low-frequency vibrations, but also a sufficiently low spring constant for high-frequency vibrations, based on the resonance of the fluid masses flowing through the first and second orifice passages 40, 52.

The arcuate voids 56 which are disposed opposite to each other in the load-receiving direction P serve to soften the elastic body 16, facilitating elastic deformation of the elastic body 16, which causes the fluid to flow through the first and second orifice passages 40, 52, thereby isolating or damping the input vibrations having different frequencies, as described above.

Further, the elastic stops 57 provided in the arcuate voids 56 and the elastic stops 34 provided in the fluid chambers 66, 68, 70, 72 limit the maximum amount of relative displacement of the inner and outer sleeves 12, 14.

The present center bearing mount 54 provides an extra advantage that the cross sectional area of fluid communication of the second orifice passage 52 is kept constant during the application of vibrations, whereby the vibration isolating or damping characteristic based on the second orifice passage 52 is kept constant.

Figure 7:
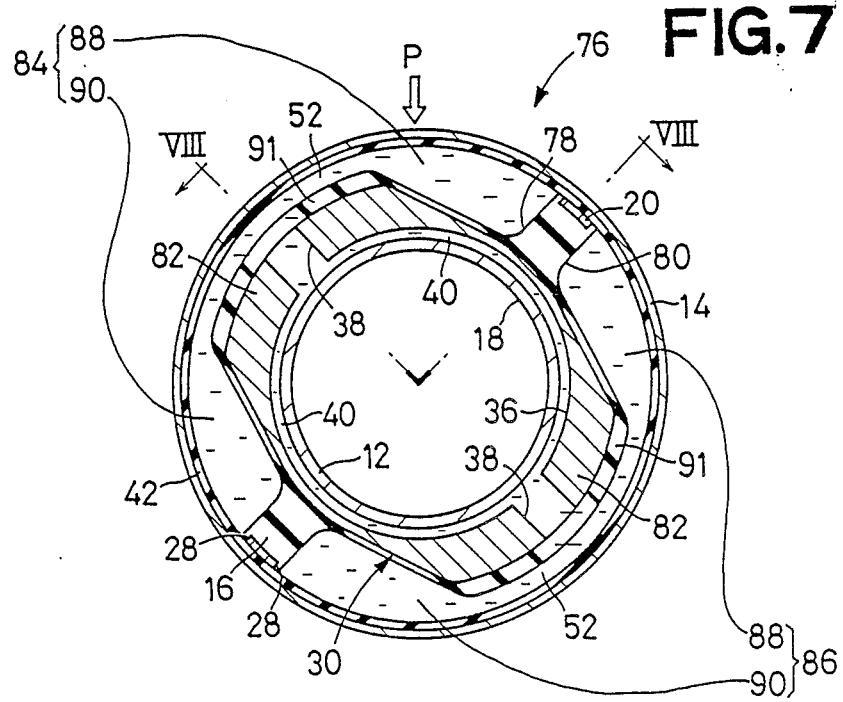
FIG. 7 is a transverse cross sectional view of a further embodiment of the center bearing mount of the invention.
Figure 8:
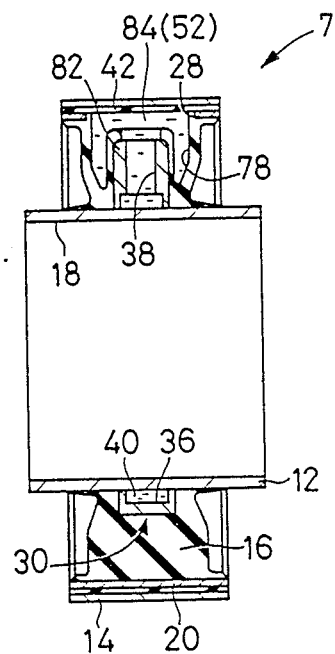
FIG. 8 is a cross sectional view taken along line VIII—VIII of FIG. 7.

Reference is now made to FIGS. 7 and 8, which show a further modified embodiment of the present invention, in the form of a center bearing mount 76.

In the present center bearing mount 76, the elastic body 16 is formed such that a first pocket 78 and a second pocket 80 each formed over about a half of the circumference of the elastic body 16 are positioned on both sides of a straight line which passes the center of the mount 76 and which is inclined a suitable angle (about 45°) relative to the load-receiving direction P (vertical direction in FIG. 7). The first and second pockets 78, 80 are open through the respective windows 28 formed through the metallic sleeve 20.

The orifice-defining ring 30 fixedly mounted on the inner sleeve 12 has a pair of partition members in the form of a pair of radial projections 82, 82 which are opposed to each other in the direction perpendicular to the straight line indicated above. The two radial projections 82 protrude a suitable distance into the respective first and second pockets 78, 80, such that each radial projection 82 is located in an intermediate portion of the corresponding pocket 78, 80 in the circumferential direction of the elastic body 16. The height of the radial projections 82 is determined so as to substantially divide the pocket 78, 80 into two halves, which are spaced from each other in the circumferential direction of the elastic body 16.

With the outer sleeve 14 fitted on the metallic sleeve 20, the first and second pockets 78, 80 are fluid-tightly closed by the sealing rubber layer 42, so that the closed pockets 78, 80 are filled with a non-compressible fluid.

The first pocket 78 partially defines a first upper fluid chamber 84, while the second pocket 80 partially defines a first lower fluid chamber 86. These first upper and lower fluid chambers 84, 86 are held in communication with each other through the first orifice passage 40 defined by the U-shaped annular groove 36 formed by the inner surface of the orifice-defining ring 30.

Each of the first upper and lower fluid chambers 84, 86 is substantially divided by the corresponding radial projection 82 into two chambers, i.e., a second upper fluid chamber 88 and a second lower fluid chamber 90, which are spaced from each other in the circumferential direction of the mount 76. The second upper and lower fluid chambers 88, 90 communicate with each other through the second orifice passage 52, which is a restricted portion defined by the radially outward end face of the corresponding radial projection 82 and the sealing rubber layer 42 of the outer sleeve 14.

In the present fluid-filled elastic center bearing mount 76, the first upper and lower fluid chambers 84, 86 are opposed to each other in the diametric direction of the mount parallel to a straight line inclined about 45° with respect to the load-receiving direction P. Further, the second upper and lower fluid chambers 88, 90 formed in each first fluid chamber 84, 86 are opposed to each other in the diametrical direction perpendicular to that in which the first upper and lower fluid chambers 84, 86 are opposed to each other. However, the first upper and lower chambers 84, 86 are substantially spaced from each other in the load-receiving or vertical direction P. Similarly, the second upper and lower fluid chambers 88, 90 are substantially spaced apart from each other in the load-receiving direction P. In this arrangement, too, vibrations applied to the center bearing mount 76 in the load-receiving direction P cause changes in the fluid pressures in the upper and lower fluid chambers 84, 88 and 86, 90, in the opposite directions. As a result, the fluid is forced to flow between the first upper and lower fluid chambers 84, 86 through the first orifice passage 40, and between the second upper and lower fluid chambers 88, 90 in each first fluid chamber 84, 86, through the second orifice passage 52.

Thus, the present center bearing mount 76 also provides an effectively high damping effect for low-frequency vibrations, and an effectively low dynamic spring constant for high-frequency vibrations, based on the resonance or flow of the fluid masses in the first and second orifice passages 40, 52, whereby excellent vibration damping or isolating characteristics are obtained over a wide frequency range of the input vibrations.

Further, the radial projections 82 of the orifice-defining ring 30 also function to limit the maximum amount of relative displacement of the inner and outer sleeves 12, 14, with the end faces of the projections 82 abutting on the outer sleeve 14. In this embodiment, the end face of each radial projection 82 is covered by a shock absorbing rubber layer 91 having a suitable thickness, so as to absorb a shock produced upon abutting contact of the radial projection 82 with the outer sleeve 14.

Figure 9:
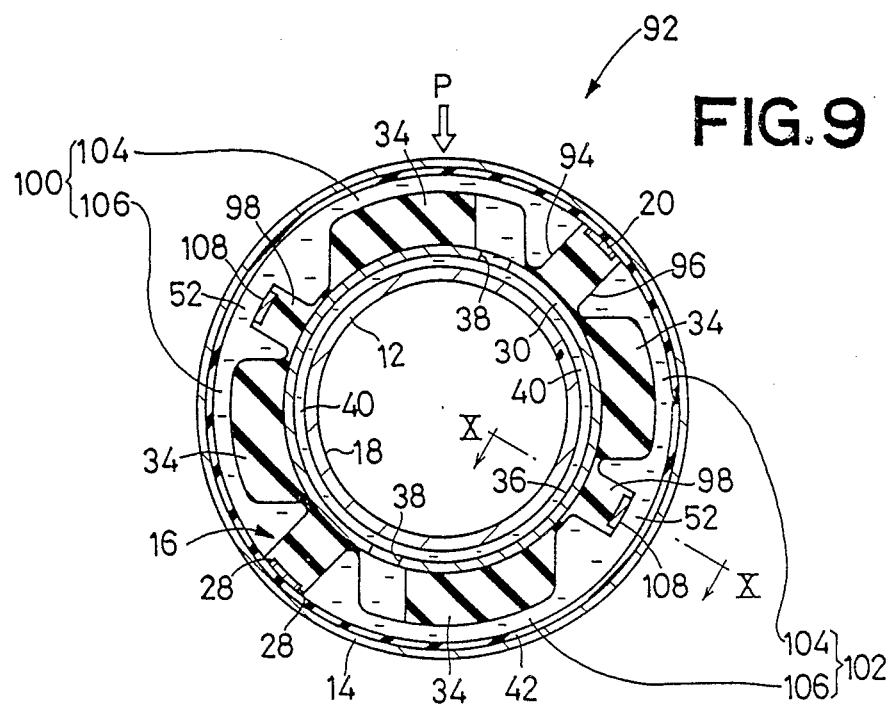
FIG. 9 is a transverse cross sectional view of a still further embodiment of the center bearing mount of the invention.
Figure 10:
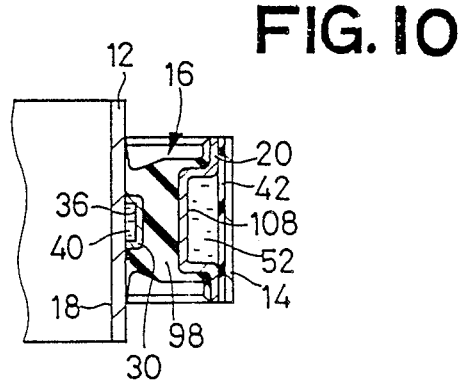
FIG. 10 is a cross sectional view taken along line X—X of FIG. 9.

A still further embodiment of the present invention is shown in FIGS. 9 and 10, in the form of a center bearing mount generally indicated at 92 in FIG. 9.

In the present center bearing mount 92, the elastic body 16 is formed such that a first pocket 94 and a second pocket 96 each formed over about a half of the circumference of the elastic body 16 are positioned on both sides of a straight line which passes the center of the mount 92 and which is inclined a suitable angle (about 45°) relative to the load-receiving direction P (vertical direction in FIG. 9), as in the preceding embodiment of FIGS. 7 and 8. The first and second pockets 94, 96 are open through the respective windows 28 formed through the metallic sleeve 20.

The elastic body 16 has a pair of partition members in the form of a pair of diametrically opposite partition walls 98 which protrude into the first and second pockets 94, 96, respectively, such that each partition wall 98 is located at a middle position of the pocket in the circumferential direction of the mount. Each of the first and second pockets 94 96 is substantially divided into two halves, which are spaced from each other in the circumferential direction.

The first and second pockets 94, 96 are fluid-tightly closed by the sealing rubber layer 42 of the outer sleeve 14, and are filled with a non-compressible fluid.

The first pocket 94 partially defines a first upper fluid chamber 100, while the second pocket 96 partially defines a first lower fluid chamber 102. These upper and lower fluid chambers 100, 102 are held in communication with each other through the first orifice passage 40 defined by the U-shaped annular groove 36 formed by the inner surface of the orifice-defining ring 30.

Each of the first upper and lower fluid chambers 100, 102 is substantially divided into a second upper fluid chamber 104 and a second lower fluid chamber 106, which are spaced from each other in the circumferential direction of the mount 92. The metallic sleeve 20 has two diametrically opposite portions in pressing contact with the radial projections 98. These portions of the sleeve 20 have respective U-shaped grooves 108 formed by the outer surface. As indicated in FIG. 10, these grooves 108 are closed by the sealing rubber layer 42 of the outer sleeve 14, whereby the second orifice passages 52 are provided. The second upper and lower fluid chambers 104, 106 in each of the first upper and lower fluid chambers 100, 102 communicate with each other through the second orifice passage 52.

In this fluid-filled elastic center bearing mount 92, too, the input vibrations cause the pressure changes in the first upper and lower fluid chambers 100, 102 and in the second upper and lower fluid chambers 104, 106, in the opposite directions, whereby the fluid is forced to flow between the first upper and lower fluid chambers 100, 102 through the first orifice passage 40, and between the upper and lower fluid chambers 104, 106 through the second orifice passages 52, as in the preceding embodiment of FIGS. 7 and 8. Thus, the present center bearing mount 92 is also capable of providing an effectively high damping effect for low-frequency vibrations, and an effectively low dynamic spring constant for high-frequency vibrations, based on the resonance or flow of the fluid masses in the first and second orifice passages 40, 52.

In the present embodiment, the maximum amount of relative displacement of the inner and outer sleeves 12, 14 is limited by the elastic stops 34 of the elastic body 16 which protrude into the respective second fluid chambers 104, 106, in the radially outward direction from the inner sleeve 12 toward the outer sleeve 14.

As in the embodiment of FIGS. 5 and 6, the cross sectional area of fluid communication of each second orifice passage 52 is held constant upon application of the input vibrations between the inner and outer sleeves 12, 14, whereby the vibration isolating or damping characteristics based on the second orifice passages 52 are kept consistent.

While the present invention has been described in its presently preferred embodiments, by way of example only, it is to be understood that the invention is not limited to the details of the illustrated embodiments.

The illustrated embodiments use two or three pairs of upper and lower fluid chambers, the chambers of each pair being opposed to each other in the load-receiving direction P, or in a diametric direction of the mount which is inclined a suitable angle with respect to the load-receiving direction P. However, the fluid-filled elastic center bearing mount according to the present invention may use four or more pairs of upper and lower fluid chambers.

In the third and fourth embodiments of FIGS. 7-8 and 9-10, each of the first upper and lower fluid chambers 84 (100) and 86 (102) is divided into the second upper and lower fluid chambers 88 (104) and 90 (106). However, the second upper and lower fluid chambers may be provided in only one of the two first fluid chambers.

It is noted that the construction or configuration of each orifice passage for fluid communication between each pair of upper and lower fluid chambers is not limited to the details of illustrated ones, but may be suitably modified.

In the illustrated embodiments, the fluid chambers are filled with a non-compressible fluid while the outer sleeve 14 is mounted on the inner assembly 22 (FIGS. 3 and 4) within a mass of the non-compressible fluid, the filling of the fluid chambers may be accomplished by providing one or more filler holes formed through the outer sleeve 14. In this case, the filler holes are closed by suitable plugs after the filling is completed.

It is to be understood that the present invention may be embodied with various other changes, modifications and improvements, which may occur to those skilled in the art, without departing from the spirit and scope of the invention defined in the following claims.

What is claimed is:

1. A fluid-filled elastic center bearing mount for flexibly supporting a propeller shaft of a motor vehicle on a body of the vehicle through a center bearing, comprising:

an inner sleeve and an outer sleeve disposed radially outwardly of said inner sleeve, said propeller shaft extending through said inner sleeve while said outer sleeve is secured to said body;

an elastic body interposed between said inner and outer sleeves for elastically connecting said inner and outer sleeves;

said elastic body partially defining at least two pairs of upper and lower fluid chambers filled with a non-compressible fluid, between said inner and outer sleeves, such that the upper and lower fluid chambers of each of said at least two pairs are spaced from each other in a circumferential direction of said inner and outer sleeves, and such that pressures of the fluid in said upper and lower fluid chambers of said each pair change in opposite directions upon application of vibrations between said inner and outer sleeves;

orifice-defining means for fluid communication between said upper and lower fluid chambers of said each pair;

said at least two pairs of upper and lower fluid chambers including a first pair of upper and lower fluid chambers and a second pair of upper and lower fluid chamber, said orifice-defining means having a first orifice passage for fluid communication between said first pair of upper and lower fluid chambers and a second orifice passage for fluid communication between said second pair of upper and lower fluid chambers, said first orifice passage comprising a groove formed in an orifice-defining ring fitted on said inner sleeve, while said second orifice passage is defined by and between said outer sleeve and a radially outward end face of a radial protrusion formed so as to extend in a direction from said inner sleeve toward said outer sleeve.

2. A fluid-filled elastic center bearing mount according to claim 1, further comprising a pair of stops which are opposed to each other in a diametric direction of the mount, for limiting a maximum amount of displacement of said inner and outer sleeves upon application of said vibrations in a load-receiving direction in which the vibrations are primarily received by the mount.

3. A fluid-filled elastic center bearing mount according to claim 2, wherein said pair of stops are disposed in one of said at least two pairs of upper and lower fluid chambers.

4. A fluid-filled elastic center bearing mount according to claim 2, wherein said pair of stops are are opposed to each other in said load-receiving direction.

5. A fluid-filled elastic center bearing mount according to claim 2, wherein said pair of stops are opposed to each other in a diametric direction of the mount inclined with respect to said load-receiving direction.

6. A fluid-filled elastic center bearing mount according to claim 2, wherein said pair of stops are formed of an elastic material.

7. A fluid-filled elastic center bearing mount according to claim 6, wherein said pair of stops are integral parts of said elastic body.

8. A fluid-filled elastic center bearing mount according to claim 2, wherein said pair of stops are integral parts of an orifice-defining member which constitute part of said orifice-defining means.

9. A fluid-filled elastic center bearing mount according to claim 1, wherein said elastic body has a pair of voids which are opposed to each other in a diametric direction of the mount parallel to said load-receiving direction in which the vibrations are primarily received by the mount.

10. A fluid-filled elastic center being mount for flexibly supporting a propeller shaft of a motor vehicle on a body of the vehicle through a center bearing, comprising:
an inner sleeve and an outer sleeve disposed radially outwardly of said inner sleeve, said propeller shaft extending through said inner sleeve while said outer sleeve is secured to said body;
an elastic body interposed between said inner and outer sleeves for elastically connecting said inner and outer sleeves, said elastic body partially defining at least two pairs of upper and lower fluid chambers filled with a non-compressible fluid, between said inner and outer sleeves, such that the upper and lower fluid chambers of each of said at least two pairs are spaced from each other in a circumferential direction of said inner and outer sleeves, and such that pressures of the fluid in said upper and lower fluid chambers of each of said at least two pairs change in opposite directions upon application of vibrations between said inner and outer sleeves, said at least two pairs of upper and lower fluid chambers consisting of a first pair of upper and lower fluid chambers which are opposed to each other in a diametric direction of the mount which is inclined a predetermined angle with respect to a load-receiving direction in which the vibrations are primarily received by the mount, and at least one second pair of upper and lower fluid chambers, the upper and lower fluid chambers of each of said at least one second pair consisting of two portions of a corresponding one of said first pair of upper and lower fluid chambers, which two portions are spaced from each other in said circumferential direction of said inner and outer sleeves; and
orifice-defining means for defining an orifice passage for fluid communication between said upper and lower fluid chambers of each of said first and said at least one second pair.

11. A fluid-filled elastic center bearing mount according to claim 10, further comprising a pair of partition members which protrude in said first pair of upper and lower fluid chambers, respectively, at least one of said first pair of upper and lower fluid chambers being substantially divided by a corresponding one of said pair of partition members, into said two portions as said each second pair of upper and lower fluid chambers.

12. A fluid-filled elastic center bearing mount according to claim 11, wherein said pair of partition members comprise a pair of radial projections protruding from an orifice-defining ring fitted on said inner sleeve, said orifice-defining means providing a first orifice passage for fluid communication between said first pair of upper and lower fluid chambers, and a second orifice passage for fluid communication between the upper and lower fluid chambers of said each second pair, said first orifice passage including a groove formed in said orifice-defining ring, while said second orifice passage including being defined by and between said outer sleeve and a radially outward end face of a corresponding one of said radial projections.

13. A fluid-filled elastic center bearing mount according to claim 11, wherein said pair of partition members comprise a pair of partition walls protruding from said elastic body, said orifice-defining means providing a first orifice passage for fluid communication between said first pair of upper and lower fluid chambers, and a second orifice passage for fluid communication between the upper and lower fluid chambers of said each second pair, said first orifice passage including a groove formed in a arcuate groove formed in an orifice-defining ring fitted on said inner sleeve, while said second orifice passage being defined by said outer sleeve and a groove formed in a member fitted on said elastic body.

14. A fluid-filled elastic center bearing mount for flexibly supporting a propeller shaft of a motor vehicle on a body of the vehicle through a center bearing, comprising;
an inner sleeve and an outer sleeve disposed radially outwardly of said inner sleeve, said propeller shaft extending through said inner sleeve while said outer sleeve is secured to said body;
an elastic body interposed between said inner and outer sleeves for elastically connecting said inner and outer sleeves, said elastic body partially defining at least two pairs of upper and lower fluid chambers filled with a non-compressible fluid, between said inner and outer sleeves, such that the upper and lower fluid chambers of each of said at least two pairs are spaced from each other in a circumferential direction of said inner and outer sleeves and are positioned on both sides of a straight line which passes through a center of the mount and which is perpendicular to a load-receiving direction in which the vibrations are primarily received by the mount, said at least two pairs of upper and lower fluid chambers comprising a first pair of upper and lower fluid chambers which are opposed to each other in a diametric direction of the mount parallel to said load-receiving direction, and at least one second pair of upper and lower fluid chambers, each of which is disposed between said first pair of upper and lower fluid chambers in said circumferential direction of said inner and outer sleeves, the upper and lower fluid chambers of said each second pair being opposed to each other in a direction parallel to said load-receiving direction, whereby pressures of the fluid in said upper and lower fluid chambers of each of said at least two pairs change in opposite directions upon application of vibrations between said inner and outer sleeves; and orifice-defining means for defining a first orifice passage for fluid communication between said first pair of upper and lower fluid chambers and a second orifice passage for fluid communication between the upper and lower fluid chambers of said each second pair, said first orifice passage comprising an annular groove formed in an orifice-defining ring fitted on said inner sleeve, while said second orifice passage is defined by and between said outer sleeve and a radially outward end face of a radial protrusion formed so as to extend in a direction from said inner sleeve toward said outer sleeve.

15. A fluid-filled elastic center bearing mount for flexibly supporting a propeller shaft of a motor vehicle on a body of the vehicle through a center bearing, comprising:

an inner sleeve and an outer sleeve disposed radially outwardly of said inner sleeve, said propeller shaft extending through said inner sleeve while said outer sleeve is secured to said body;

an elastic body interposed between said inner and outer sleeves for elastically connecting said inner and outer sleeves, said elastic body partially defining a first and a second pair of upper and lower fluid chambers filled with a non-compressible fluid, between said inner and outer sleeves, said first pair and said second pair being opposed to each other in a direction perpendicular to a load-receiving direction in which the vibrations are primarily received by the mount, the upper and lower fluid chambers of each of said first and second pairs being spaced from each other in a circumferential direction of said inner and outer sleeves, and positioned on both sides of a straight line which passes through a center of the mount and which is perpendicular to said load-receiving direction, said upper and lower fluid chambers of said each pair being opposed to each other in a direction parallel to said load-receiving direction, whereby pressures of the fluid in said upper and lower fluid chambers of said each pair change in opposite directions upon application of vibrations between said inner and outer sleeves; and orifice-defining means for defining a first orifice passage for fluid communication between said first pair of upper and lower fluid chambers and a second orifice passage for fluid communication between said second pair of upper and lower fluid chambers, said first orifice passage comprising an arcuate groove formed in an orifice-defining ring fitted on said inner sleeve, while said second orifice passage is defined by said outer sleeve and a groove formed in a member fitted on said elastic body.

* * * * *